(12) United States Patent
Tanner et al.

(10) Patent No.: US 7,343,560 B1
(45) Date of Patent: Mar. 11, 2008

(54) METHOD AND SYSTEM FOR GENERATING DYNAMIC IMAGES

(75) Inventors: Ronald Martin Tanner, Provo, UT (US); Matthew Edward Lewis, Spanish Fork, UT (US); Nitu Choudhary, Orem, UT (US)

(73) Assignee: Novell, Inc., Provo, UT (US)

( * ) Notice: Subject to any disclaimer, the term of this patent is extended or adjusted under 35 U.S.C. 154(b) by 1116 days.

(21) Appl. No.: 09/766,407

(22) Filed: Jan. 22, 2001

(51) Int. Cl.
*G06F 15/177* (2006.01)
*G06F 9/445* (2006.01)

(52) U.S. Cl. .................. 715/735; 715/744; 709/220; 717/175; 717/177

(58) Field of Classification Search ............... 345/745, 345/744, 747, 734; 717/171, 176, 177, 175, 717/178; 709/203, 220; 715/745, 747, 749, 715/734, 735, 748, 744
See application file for complete search history.

(56) References Cited

U.S. PATENT DOCUMENTS

| | | | | |
|---|---|---|---|---|
| 5,155,847 A | * | 10/1992 | Kirouac et al. | 709/221 |
| 6,052,720 A | * | 4/2000 | Traversat et al. | 709/220 |
| 6,247,128 B1 | * | 6/2001 | Fisher et al. | 713/100 |
| 6,487,718 B1 | * | 11/2002 | Rodriguez et al. | 717/177 |
| 6,505,084 B2 | * | 1/2003 | Blumenstock | 700/21 |
| 6,751,658 B1 | * | 6/2004 | Haun et al. | 709/222 |
| 6,804,774 B1 | * | 10/2004 | Larvoire et al. | 713/2 |

\* cited by examiner

*Primary Examiner*—Tadesse Hailu
*Assistant Examiner*—Blaine Basom
(74) *Attorney, Agent, or Firm*—Pillsbury Winthrop Shaw Pittman, LLP

(57) ABSTRACT

A method and system for imaging a workstation (or other device) and then associating that image with a specific device are disclosed. The present invention enables an administrator to take an image of a basic workstation (with minimum or no applications) and then when the image is downloaded to the workstation, the service may look into a Directory and download with the image the set of files associated with an Application Object that has been associated with the image in the Directory. Another embodiment of the present invention further provides a method and system for applying an image to a workstation that had never been imported into the tree. A rules-based system may be implemented to enable one or more workstations that are booting to find the image and have it applied.

24 Claims, 12 Drawing Sheets

METHOD AND SYSTEM FOR GENERATING DYNAMIC IMAGES

FIELD OF INVENTION

The present invention relates generally to generating a representation of a network workstation or other device and in particular, to a method and system for generating dynamic or personalized images by association of applications to a base image, wherein image association occurs through a rules based system.

BACKGROUND OF THE INVENTION

User and desktop management has been traditionally recognized as an expensive aspect of managing and/or owning a network. Management may include installing and configuring workstations, deploying software and operating systems and applications, repairing damaged workstations and conveying desktop and other images to various destinations. Network tools have included the ability to "image" a workstation or other device, that is, detecting and recording information related to memory, storage, processor, applications, directory access privileges and other features and resources representing the overall configuration state of a network device. Generally, applications have been installed or configured separately on individual workstations. Thus, a great amount of time and effort may be involved on application and other updates and configuration.

Currently, image systems may enable a user to inject individual files into an image. However, an efficient system for injecting whole applications with a directory link has not yet been implemented. Furthermore, image systems have traditionally required that the exact image to be applied must be specified. The current systems and methods available do not provide an efficient imaging system for generating dynamic/personalized images.

These and other drawbacks exist with current systems.

SUMMARY OF THE INVENTION

The present invention relates to a system and method capable of imaging a workstation (or other device) and then associating that image with a specific device. The present invention enables an administrator (or other authorized entity) to take an image of a basic workstation. A basic workstation may include a workstation with a minimum amount or no applications. When the image is downloaded to the workstation, the service may scan a Directory and download with the image the set of files associated with an Application Object that has been associated with the image in the Directory.

Another embodiment of the present invention further provides a method and system for applying an image to a workstation that had never been imported into the tree. According to another embodiment of the present invention, a rules based or other system may be implemented to enable one or more workstations that are booting to find the image and have the image applied.

Additional advantages of the invention will be set forth in part in the description which follows, and in part will be evident from the description, or may be learned by practice of the invention. The objects and advantages of the invention may be realized by the instrumentalities and combinations particularly pointed out in the appended claims.

DETAILED DESCRIPTION OF THE PREFERRED EMBODIMENTS

Figure 1:
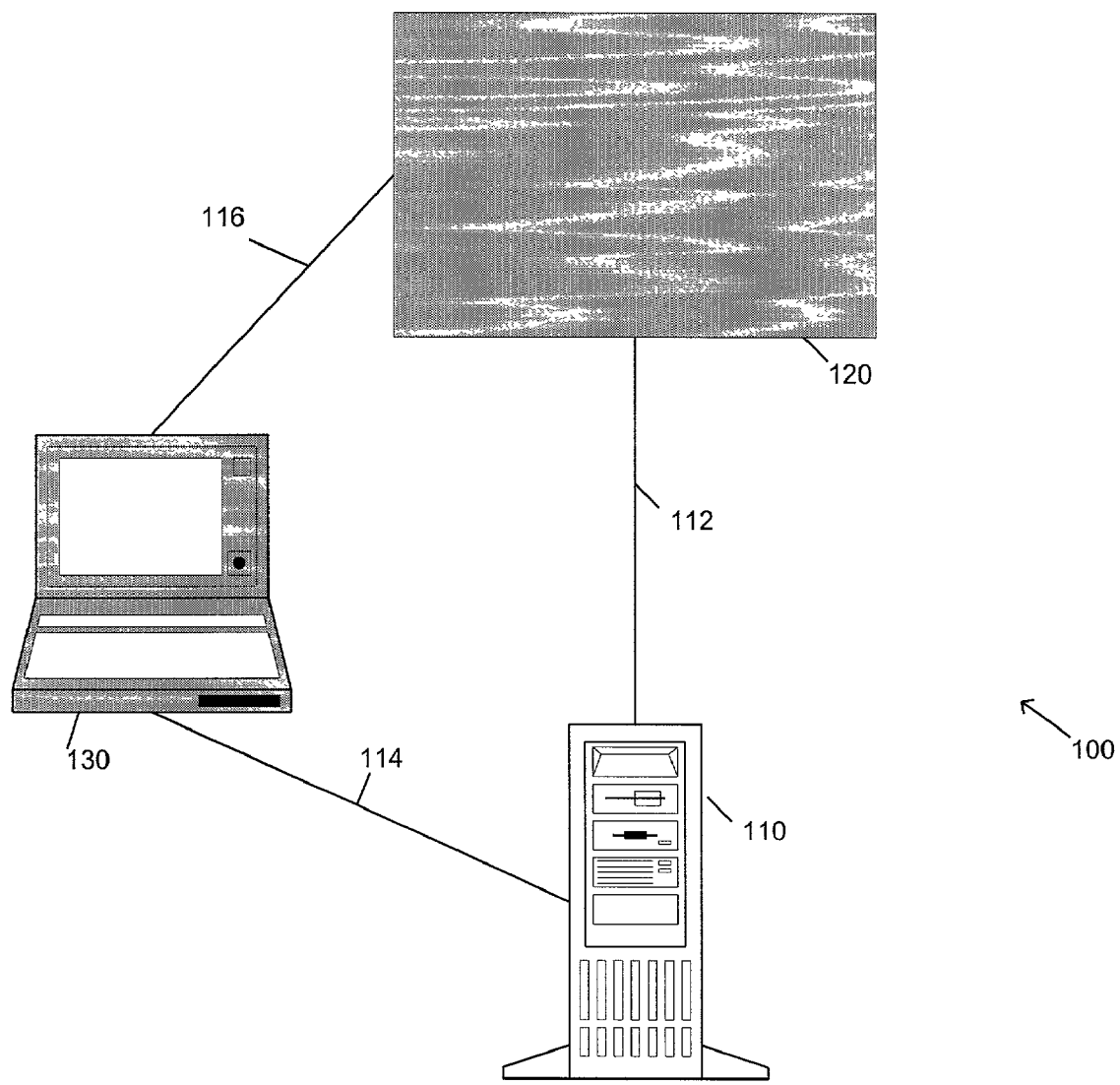
FIG. 1 is a diagram of an example of an architecture of an imaging system, according to an embodiment of the present invention.

FIG. 1 illustrates an example of a high level architecture of an image system 100, according to an embodiment of the present invention. Various connections may be constructed during imaging of a workstation. For example, agents may reside on workstation 130 and on an image server 110. Agents may include software programs that perform a service (e.g., alert the user, monitor data, search for information, etc.). These agents may communicate with directory services in directory 120 to retrieve policies and administered configuration information that may be used to dictate the behavior of the agents. Other information may also be retrieved.

Connection 112 may be an initial connection established in the system. When image server 110 is brought up in the network and the associated imaging agent is initiated, image server 110 may attempt to find a related Directory Services Object in Directory 120. Once this object is found, it may authenticate as that object and look for associated policies related to the deployment of images. Other information may also be identified.

Connection 114 may be used when a workstation agent that resides on workstation 130 is activated, according to an embodiment of the present invention. If booting of image floppies starts the workstation agent, then the workstation agent may connect with image server 110. An image for workstation 130 and other information may be requested. The workstation agent may send information concerning the hardware particulars of workstation 130 in order to assist image server 110 in locating the proper image. Other information may be conveyed.

If the workstation agent is started as part of the normal boot process, then the workstation agent may connect to the image server 110 to see if there is any work or other information that has been requested regarding workstation 130.

Once image server 110 has received the information, image server 110 may check with directory services in directory 120 to determine whether workstation 130 has an associated Workstation Object. If so, image server 110 may determine whether the administrator has requested that an image be taken from or placed on the workstation. If there is no workstation object in directory 120, then image server 110 may follow rules specified in associated one or more policies and determine from those rules which image to place on workstation 130. Other information may also be determined. Once an image has been identified, the image may transmit over connection 114 and the workstation agent may place the identified image on the hard drive or other destination.

Connection 116 may enable workstation 130 to record information regarding the workstation into a corresponding directory object in Directory 120.

Various directory services objects may be used in conjunction with an imaging system of the present invention. For example, directory services objects may include an Imaging Server Policy Object, Workstation Object, Workstation Image Object, Workstation Imaging Policy Object, and Application Object. Other directory services objects may also be implemented.

An Imaging Server Policy Object may allow an administrator (or other entity) to configure rules that consist of logic related to the type of hardware and other information that may be reported by the workstation (e.g., 500 MB hard disk). Based on these logic rules, the administrator may identify the image to be given when the rules are satisfied or based on other predetermined triggering events or conditions. This policy may be consumed by the image server. According to an embodiment of the present invention, the policy may be effective if the workstation has not been registered and a workstation object for the device does not exist. The Image server may then authenticate into the system as the associated object.

A Workstation Object may represent the workstation in the directory. The Workstation Object may maintain various information about the workstation, such as last image placed, last user, inventory, etc. The administrator (or other authorized entity) may affect the image system in this object by indicating in the workstation object that an image may be taken or placed on the workstation. The next time that the workstation is booted, it may perform the requested task. Other tasks may be identified.

A Workstation Image Object may represent an image that may be stored on a file system.

A Workstation Imaging Policy Object may allow the administrator (or other authorized entity) to configure one or more rules that may consist of logic related to the type of hardware and other information that may be reported by the workstation (e.g., 500 MB hard disk). Based on these logic rules (and/or other information), the administrator may identify the image to be given when the rules are satisfied. Linking the rule to a particular Workstation Image Object may identify the image. According to an embodiment of the present invention, this policy may be effective if the workstation has been registered and a workstation object for the device exists.

An Application Object in a directory may represent an application. The present invention may provide the ability to take a snapshot of an application as it is being installed or take a Microsoft™ Installer package ("MSI") or other application and place the application in the directory. MSI may include a format for a database file that may contain information that may be used to install applications on a workstation or other device. Other formats may be implemented as well. In addition to making the files accessible through the directory, the present invention may also provide the administrator with the ability to customize the installation with variables and configuration for each application. Application objects may then be associated with user, workstation and/or other objects. When the application objects are associated with a user or workstation, then the associated users may have access to the application. In addition, the application may be automatically run or made available from any workstation or other device. For example, if the application is associated with a workstation, then the application may be placed on that workstation and may be available to any entity or individual logging onto that specific workstation or otherwise accesses the specific workstation. Thus, files may be inserted into an image and placed on the workstation at image time. Other variations may be implemented.

Figure 2A:
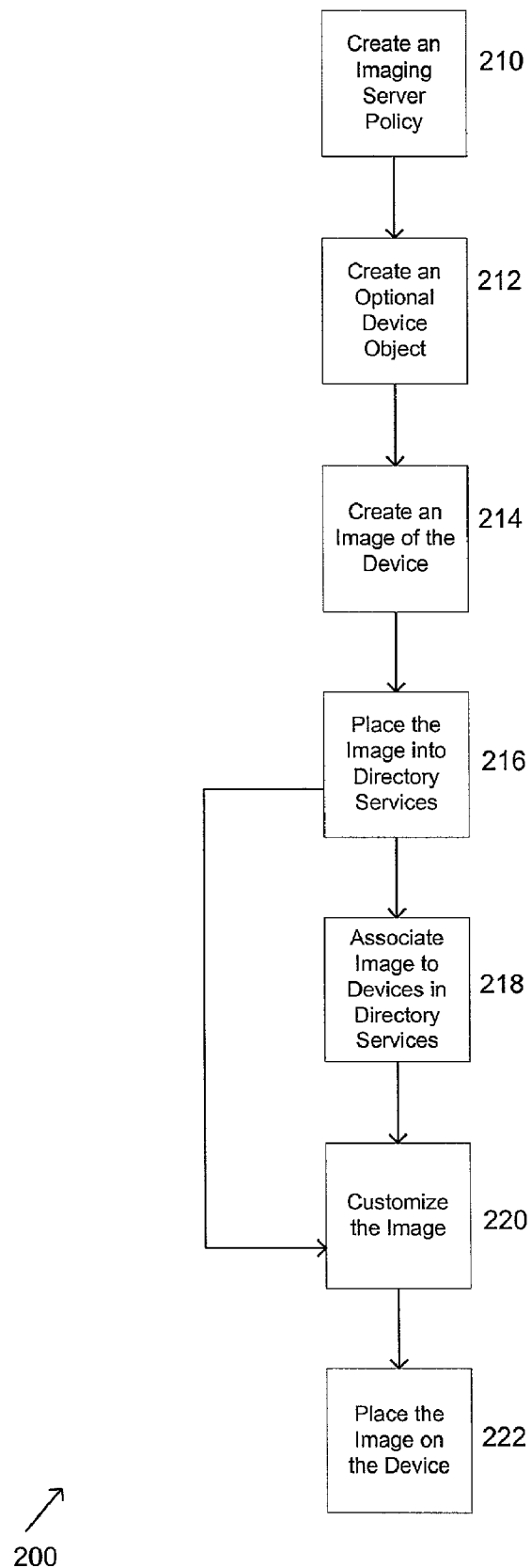
FIG. 2a is a flowchart illustrating a process for enabling interaction with different parts of an imaging system, according to an embodiment of the present invention.

FIG. 2a is a flowchart illustrating a process 200 for enabling interaction with different parts of an imaging system, according to an embodiment of the present invention. At step 210, an image server policy may be created. At step 212, an optional device object may be created. At step 214, an image of the device may be created. At step 216, the image may be placed into directory services. According to an embodiment of the present invention, there may be an optional step 218 wherein the image may be associated with devices in directory services. At step 220, the image may be customized. At step 222, the customized image may be placed on the device. These steps will now be described in detail below.

At step 210, an imaging server policy may be created in a directory. The imaging server policy may be associated with a specific image server and may contain configuration information for the image server. Other information may also be included. In particular, the imaging server policy may include a set of rules or other criteria that may be applied to any device (e.g., workstation) that may be seeking for or delivering an image to an image server.

When the image server receives information from the requesting device (e.g., workstation), the image server may verify whether a specific image is associated with the device (e.g., workstation). If not, then the image server may proceed down the rules or other criteria that may be based on hardware (or other) characteristics of the device (e.g., workstation). Upon finding a matching rule or criteria, the image associated with the rule or criteria may be applied to the device (e.g., workstation).

The rules or criteria may consist of hardware descriptions of the device (e.g., workstation), such as the workstation type, disk drive size, amount of RAM, NIC cards, etc. Other characteristics of the device (e.g., workstation) may also be used. Matching the set of conditional rules to an image object (in the directory, for example) allows the image server to provide an image to one or more devices (e.g., workstations) that have the appropriate hardware.

In addition to rules or criteria, the Imaging Server Policy may also hold security and other configuration parameters that may be enforced by the image server. For example, these security measures may include specifying the directories on the image server that may hold images that are taken of workstations and whether an image may be overwritten. Other security features may be implemented. Additionally, the imaging server policy may identify a set of IP addresses and other networking and configuration parameters (e.g., computer name and other identifiers) that may be applied to a device (e.g., workstation) when the image is placed on the device (e.g., workstation). Other information and/or parameters may also be specified.

At step 212, an optional device object may be created. A device, such as a workstation, may have a representation in the directory. For example, this representation may be an object in the directory. By having an object in the directory, an administrator may then associate specific policies and/or images directly to the device object. Other information may also be associated with the device object. When the device requests that the image be applied, the image server may be informed that the device object is located in the directory. Then the image server may check the device object to determine whether an image or other policies affecting imaging are being applied to the device. It may then enforce the policy and apply the associated image.

According to another embodiment of the present invention, the imaging system may function without the device object created in the directory. Without the device object, the image server may rely on a Imaging Server Policy that may be associated with each image server.

Figure 2B:
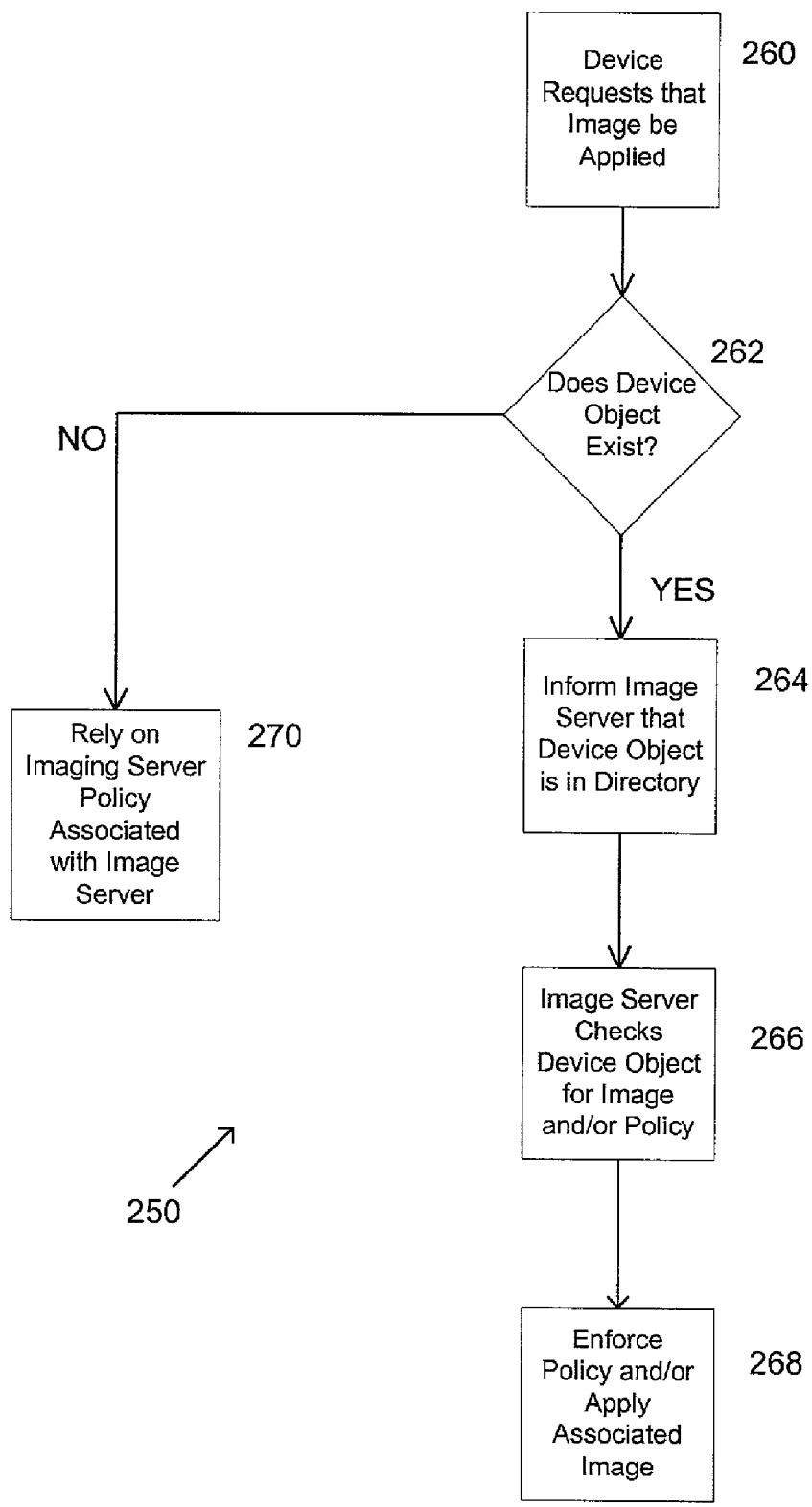
FIG. 2b is a flowchart illustrating a step for associating policies and/or images to a device object, according to an embodiment of the present invention.

FIG. 2b is a flowchart 250 illustrating a step for associating policies and/or images to a device object, according to an embodiment of the present invention. At step 260, a device may request application of an image. At 262, it may be determined whether an associated device object exists in a directory. If an associated device object exists, the image server may be informed that the device object is located in the directory, at step 264. The image server may retrieve information from the device object, such as images and/or policies, at step 266. At step 268, one or more policies may be enforced and one or more associated images may be applied. If an associated device object does not exist, the Imaging Server Policy associated with the image server may be relied upon, at step 270.

At step 214, an image of the device may be created. An administrator (or other authorized entity) may create an image of a device (e.g., workstation). Once this is completed, then the image may be applied to the same, similar or related devices.

According to another embodiment of the present invention, the image may include associated modifications or additions. For example, the administrator may set up a workstation to hold a "golden" copy of the desired workstation for business or other applications. This "golden" workstation may have any operating system and any one or more software packages that the administrator may desire to have in a "base" image of the workstation or other device. Additional add-on images may be applied to the base image when the image is applied to the workstation, for example. Therefore, it may be advantageous for the administrator to develop a base image of a workstation (or other device) with minimum or no applications that may be added with add-on images. This enables upgrades of images to be done by simply changing the applications add-on images, keeping the administrator from having to retake another "golden" image.

Figure 3:
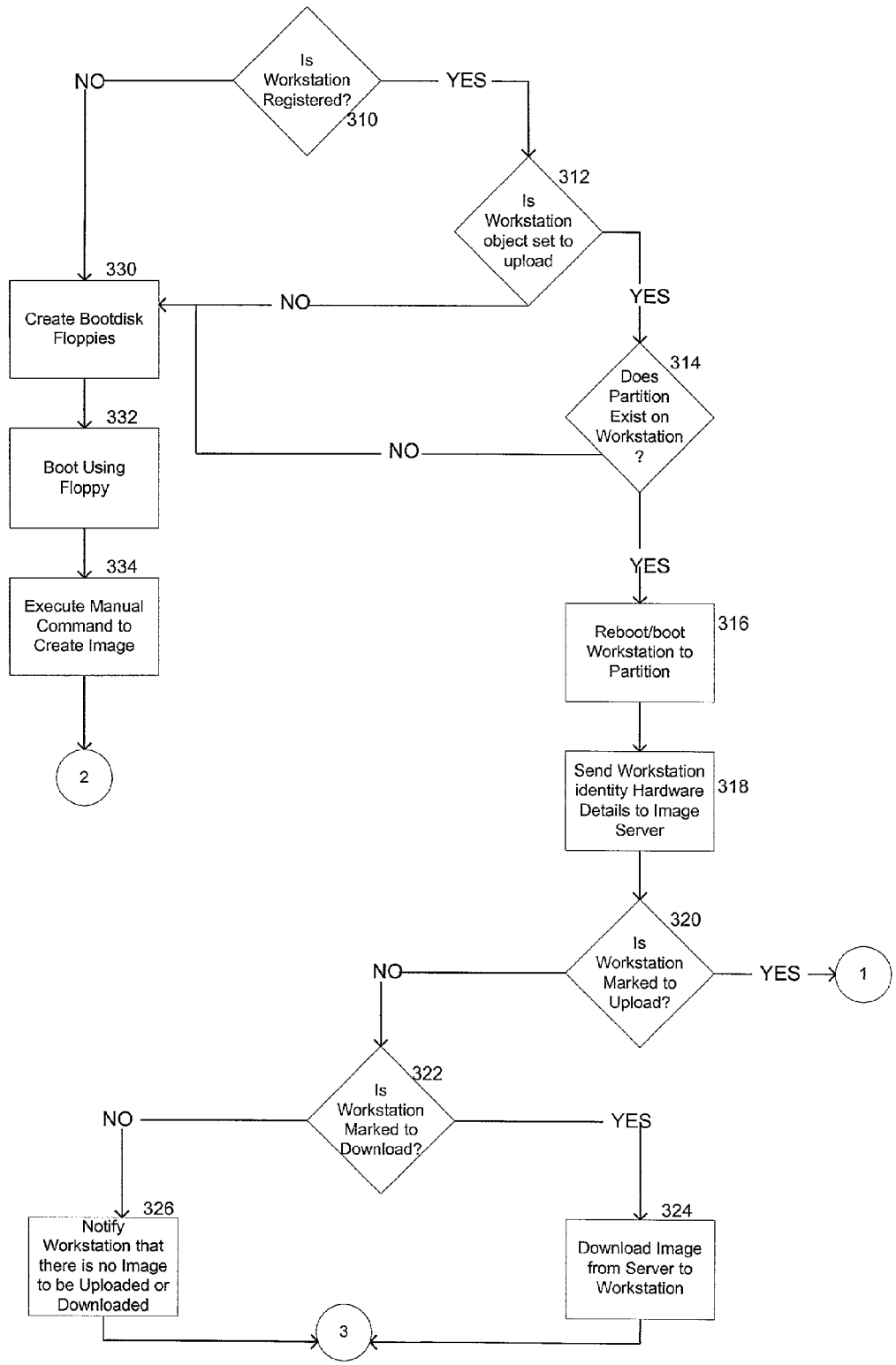
FIGS. 3-5 are flowcharts illustrating a process for creating an image of a device, according to an embodiment of the present invention.
Figure 4:
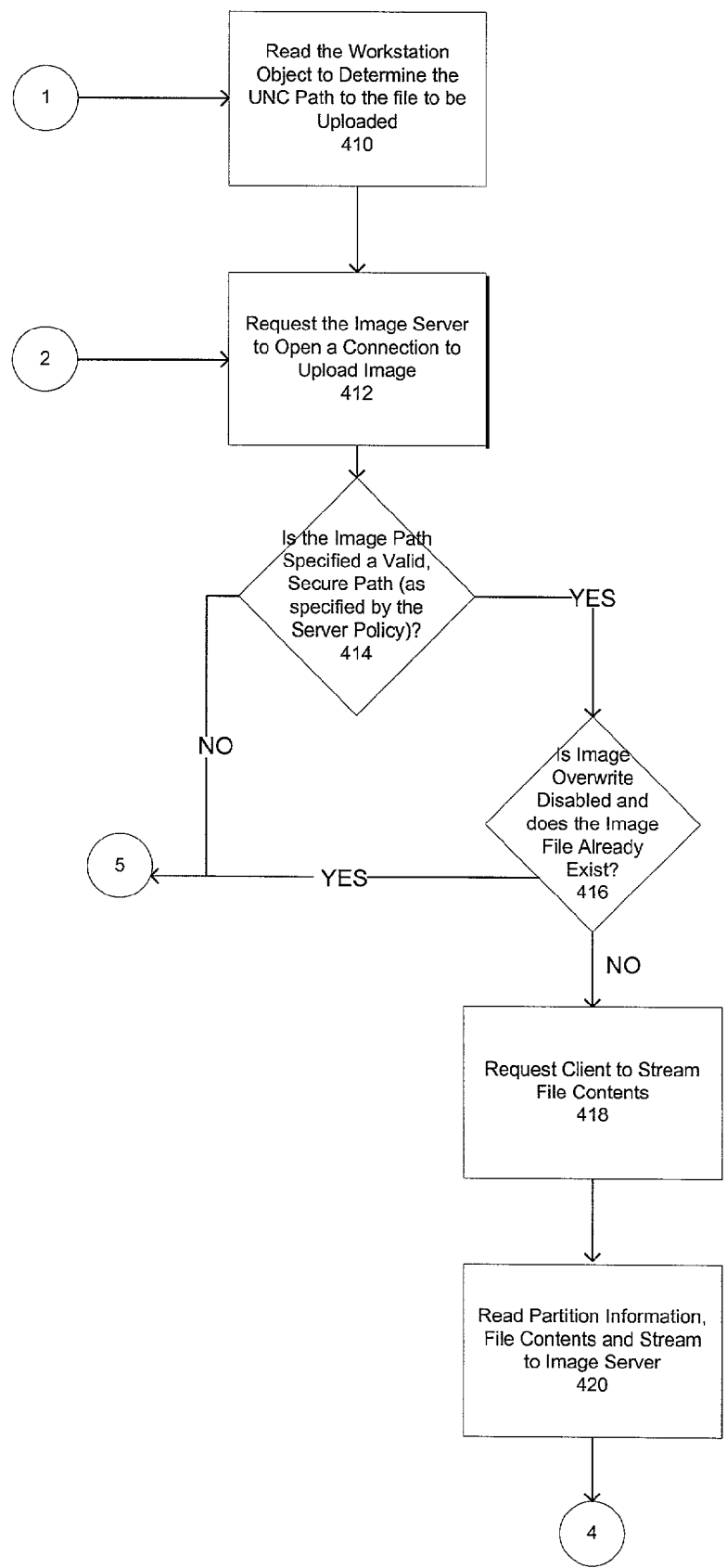
Figure 5:
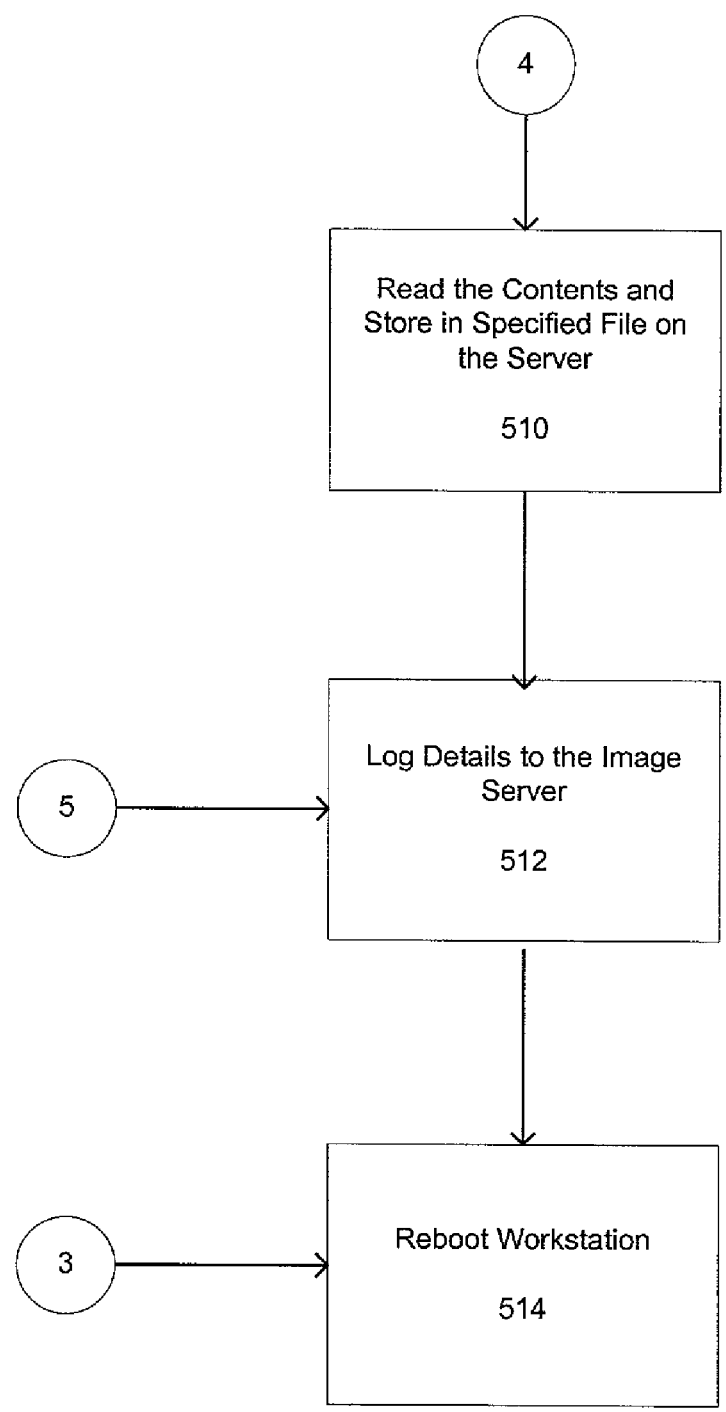

FIGS. 3-5 illustrate flowcharts for a process for creating an image of a device, such as a workstation, according to an embodiment of the present invention. At 310, it may be determined whether a workstation is registered. If a workstation is registered, it may be determined whether the workstation object is set to upload an image, at 312. If so, it may be determined whether an imaging partition exists on the workstation, at 314. The imaging partition may be Linux or another partition where the imaging client may be stored and launched when the partition is activated. If such a partition exists on the workstation, an administrator may reboot/boot the workstation to the partition (e.g., Linux or other partition), at 316. At 318, an imaging client may send workstation identity (e.g., DN, tree, etc.), hardware and/or other details to an image server. At 320, it may be determined whether the workstation is marked to upload.

If the workstation is not registered, an administrator may create bootdisk floppies using a Bootdisk Creator or other mechanism, at 330. The administrator may then boot using a floppy in manual mode or other mechanism, at 332. The administrator may execute a manual command to create an image, specifying an image server, an image file name (e.g., UNC path) and/or other information, at 334.

If the workstation is not marked to upload, the image server may determine whether the workstation is marked to download, at 322. If so, the image server may download an image from the image server to the workstation or other destination, at 324. If not, the image server may notify the workstation that there is no image to be uploaded or downloaded.

If the workstation is marked to upload, the image server may read or otherwise access the workstation object to determine the Uniform Naming Convention ("UNC") path to the file to be uploaded, at 410 in FIG. 4. The obtained information may then be sent to the client. At 412, an imaging client may request the image server to open a connection to upload the image and save the image to a specified image file or other destination. Image server may then determine whether the image path specified is a valid, secure path, as indicated by the server policy, at 414. If so, the image server may determine whether the image is overwrite disabled and whether the image file currently exists, at 416. If not, the image server may inform the client to stream file contents, at 418. Imaging client may then read partition information, file contents, stream to server and/or other information at 420.

At 510 in FIG. 5, the image server may read or otherwise access the contents and store the contents in a specified file on the server or other destination. The imaging client may then log details (and other information) to an image server, for example, at 512. The imaging client may then reboot the workstation, at 514.

At step 216, the image of the device may be placed into directory services. Once an image has been taken of a workstation or other device, an object in directory services may be used to reference the image. This enables other devices to be associated with the image. According to another embodiment of the present invention, add-on images and other modifications to the image may be performed. For example, an administrator may be requested to enter a program and create an image object. This image object may refer to an image file that may be stored on the image server or other location.

At step 218, one or more images may be associated to devices in directory services. According to an embodiment of the present invention, step 218 may be optional. Once an image object is created in directory services, the image may be associated with other objects in the directory, creating a relationship between image and device. Relationships with various policies may also be established. Once an image is in the directory, various imaging policies may be invoked, such as Image Server Policy and Workstation Imaging Policy, for example. Imaging policies may allow hardware restriction rules to be specified. Other rules, criteria and/or conditions may also be specified. For example, hardware restriction rules may indicate that such rules should be satisfied for an image to be applied. The applied image may be identified via the image object in the directory. Other modes of identification may also be implemented.

Additionally, an image may be associated directly to the optionally created workstation (or device) object in the directory. By directly associating the image object with the device object, the system may be informed that the specified image should be the image applied to the device regardless of any rules specified in the policies. In addition, an image may be associated with a set of device objects in the directory. Other associations may also be established.

At step 220, the image may be customized. Once a base image is created from a workstation (or other device) and stored in the directory (e.g., a directory image object may point to the actual image stored on the file system of a server), additional images may be associated to the base image. For example, when the image is placed on the workstation, additional "add-on" images may be automatically placed onto the workstation, presenting to the user as if there were a single image placed on the workstation. These additional images may come from other workstation images or from applications that have been stored in the directory. Other sources may also be specified.

Customizing images may be particularly useful as applications change or are updated, or as additional applications are applied to workstations. For example, the administrator may create the application objects for the new applications and then associate the application object image with the base image of the workstation. Then, the next time the image is placed on a workstation or other device then the base image and the image of the new applications may be applied to the workstation or other device. Thus, the present invention enables the base image to stay constant while associated applications may be updated to dynamically change the image.

Figure 6:
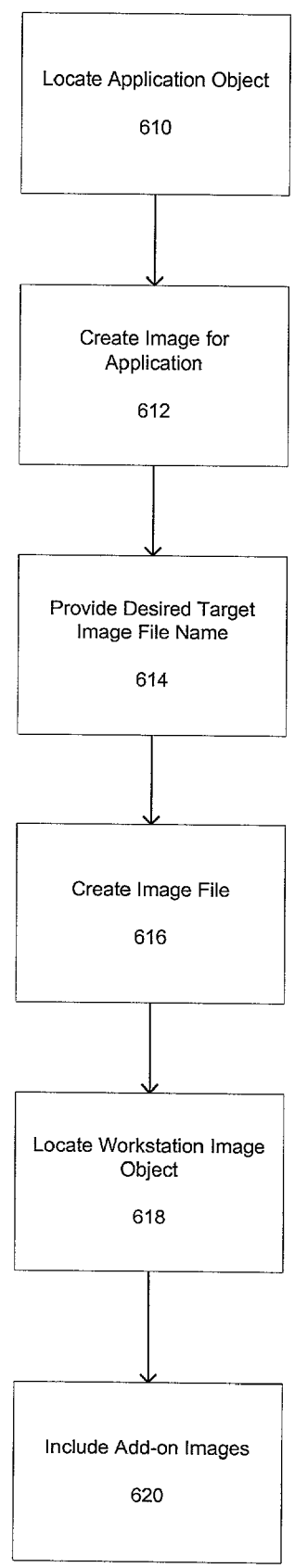
FIG. 6 is a flowchart illustrating a process for constructing dynamic images, according to an embodiment of the present invention.
Figure 7:
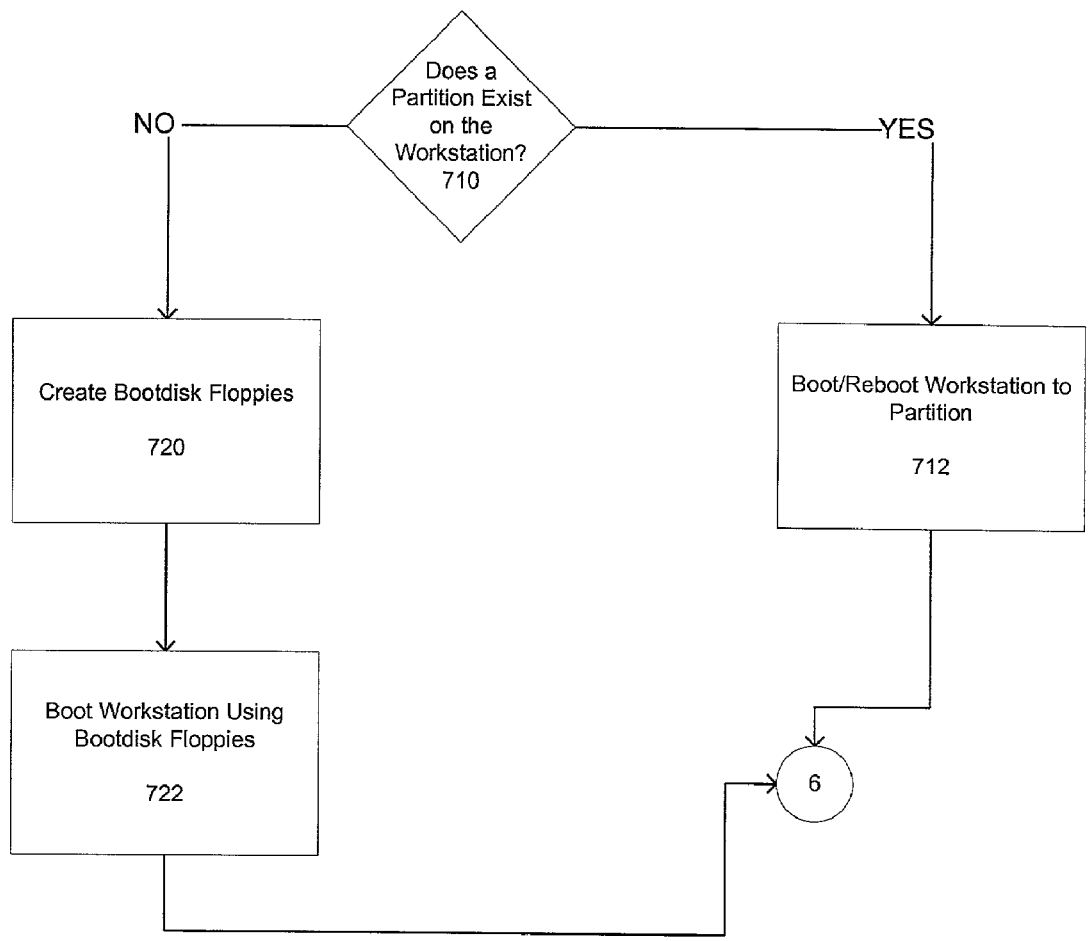
FIGS. 7-11 are flowcharts illustrating a process for placing an image on a device, according to an embodiment of the present invention.

FIG. 6 illustrates a flowchart of a process for constructing dynamic images, according to an embodiment of the present invention. For example, application images may be placed with base images to construct dynamic images, through a management tool or other mechanism. At step 610, an application object may be located. An administrator may browse the directory and locate a desired application object in a tree or other environment. At step 612, an image for the application may be created. For example, a management tool may provide a page associated with imaging. The administrator may go to this page (or similar environment) and create an image for this application. At step 614, the administrator may provide information related to the desired target image file name. Other information may also be provided. At step 616, an image file may be created from the application object files defined in the object. This may create an image file that may be compatible with the image server and client. At step 618, a workstation image object may be located. Once the image file is created, the administrator may locate the workstation image object to include in this application. At step 620, these add-on images may be included. Within the image object there may be a page (or other environment) that allows the administrator to include add-on images with this image. In this page, the administrator may select the image file associated with the application object. Thus, the application image may be added to or otherwise associated with the set of images to be applied to any device receiving the base image.

According to another embodiment of the present invention, additional files may be added to the base image. These files may be inserted directly into the image if the image had been created previously. For example, additional files may be inserted from anywhere in the network into the image.

According to another embodiment of the present invention, file sets may be defined. File sets may be groupings of files that currently exist in the image. Through an image explorer or other mechanism, the administrator may define the file set that each file may be associated with. A file may be part of none or any number of file sets available. When the image is applied, the policies or the administrator may request that one or more identified file sets be used in the image. Thus, the present invention enables one or more files or file sets to be inserted into images. This may result in applying the specified files at image time to the target device.

Therefore, a single image of a basic workstation (e.g., without no or minimum applications) may be taken so that when the image is downloaded to the workstation, the service may look into a directory and download with the image a set of files associated with an application object that has been associated with the image in the directory. Thus, an entire application (which may be include files and sets of files) may be injected into an image with a directory link or other mechanism. Other variations may be implemented.

According to another embodiment of the present invention, application objects may be associated with the image object in the directory. Thus, when the image is being requested, the image of the application may be directly created and applied on the fly as the image is transmitted to a target workstation or other destination. Images of applications may be applied on the fly based on user characteristics (e.g., user identity) and other criteria or factors. For example, when a user logs into a device where the device may be scheduled to be imaged, the image may contain the image and any administered add-on images (e.g., created images, application images and other images) that may have been administered with the device or base image. Other information may also be included. For example, the image may include images to applications that a specific user (or group of users) may be authorized to access through an association of the application object to a user object (e.g., the identity that the user has to the system). Therefore, the feature of the present invention enables the image to be dynamically customized for the device as well as for the user with access to the device or other authorization. Other applications may be implemented.

At step 222, the image may be placed on the device. Once an image has been placed in the directory, and associated add-on images have been defined, then the culminated image (e.g., base image plus add-on images) may be applied to a device (e.g., workstation) in the network. The applying of the image may be done to workstations that are registered with the directory (e.g., have a corresponding device object) and with devices that have not been registered with the directory.

FIGS. 7-11 illustrate a flowchart for placing an image on a device, according to an embodiment of the present invention. At 710, it may be determined whether an imaging partition (e.g., Linux or other partition) exists on the workstation (or device). If so, the administrator may boot/reboot the workstation to the identified partition (e.g., Linux partition), at 712. If not, the administrator may create one or more bootdisk floppies using a bootdisk creator or other mechanism, at 720. The administrator may then boot the workstation in automatic (or other) mode using the one or more bootdisk floppies, at 722.

Figure 8:
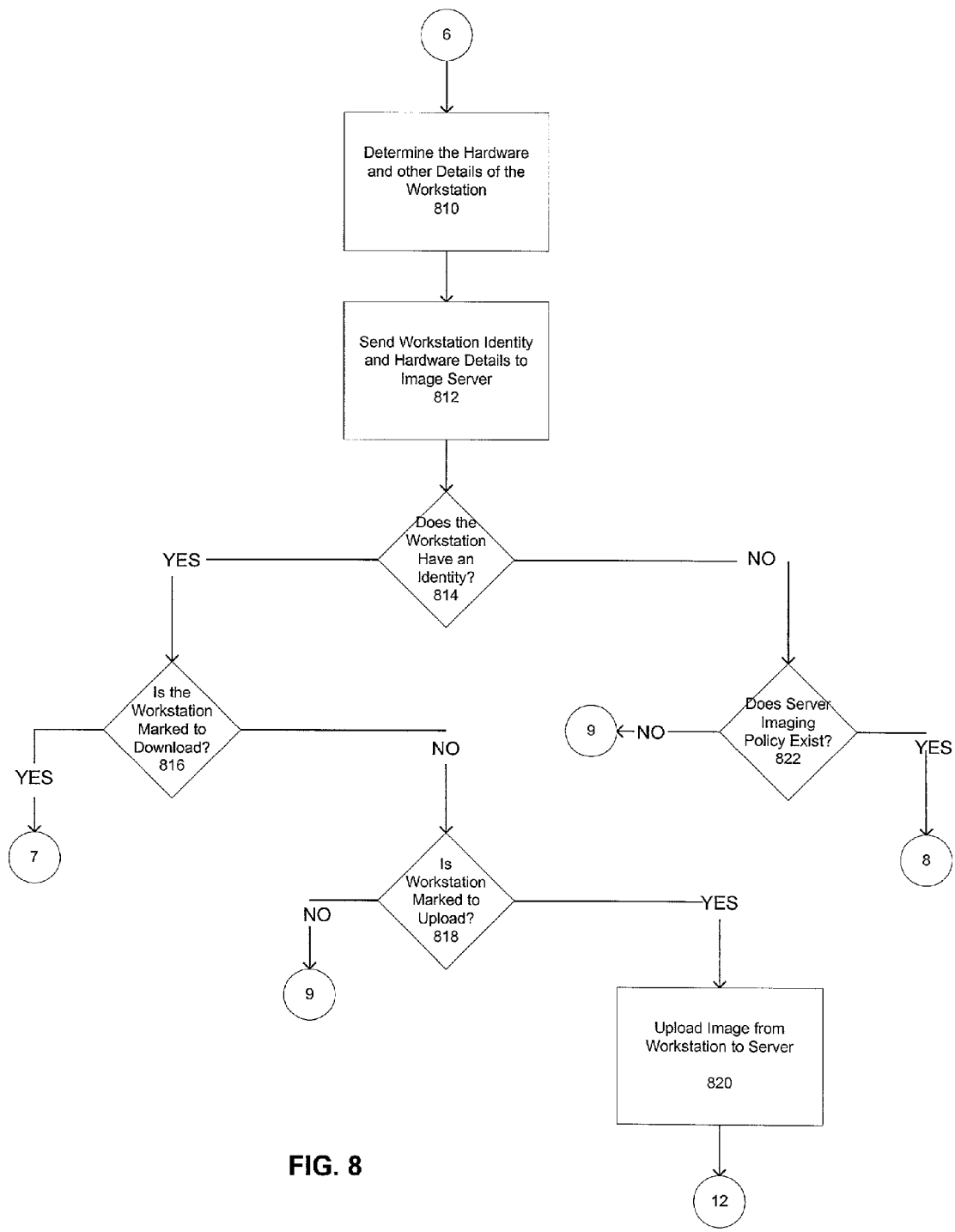

At 810 in FIG. 8, an imaging client may determine the hardware (and/or other) details of the workstation (e.g., CPU, RAM, disk size, NIC card, etc.). The imaging client may then send workstation identity information (e.g., DN, tree, etc.) and hardware (and/or other) details to an image server, at 812. At 814, it may be determined whether the workstation has a workstation object (or identity). If so, the image server may determine whether the workstation is marked to download, at 816. If not, the image server may determine whether the workstation is marked to upload, at 818. If so, the image server may upload an image from the workstation to the server, at 820.

If the workstation does not have an identity, it may be determined whether a server imaging policy exists, at 822.

Figure 9:
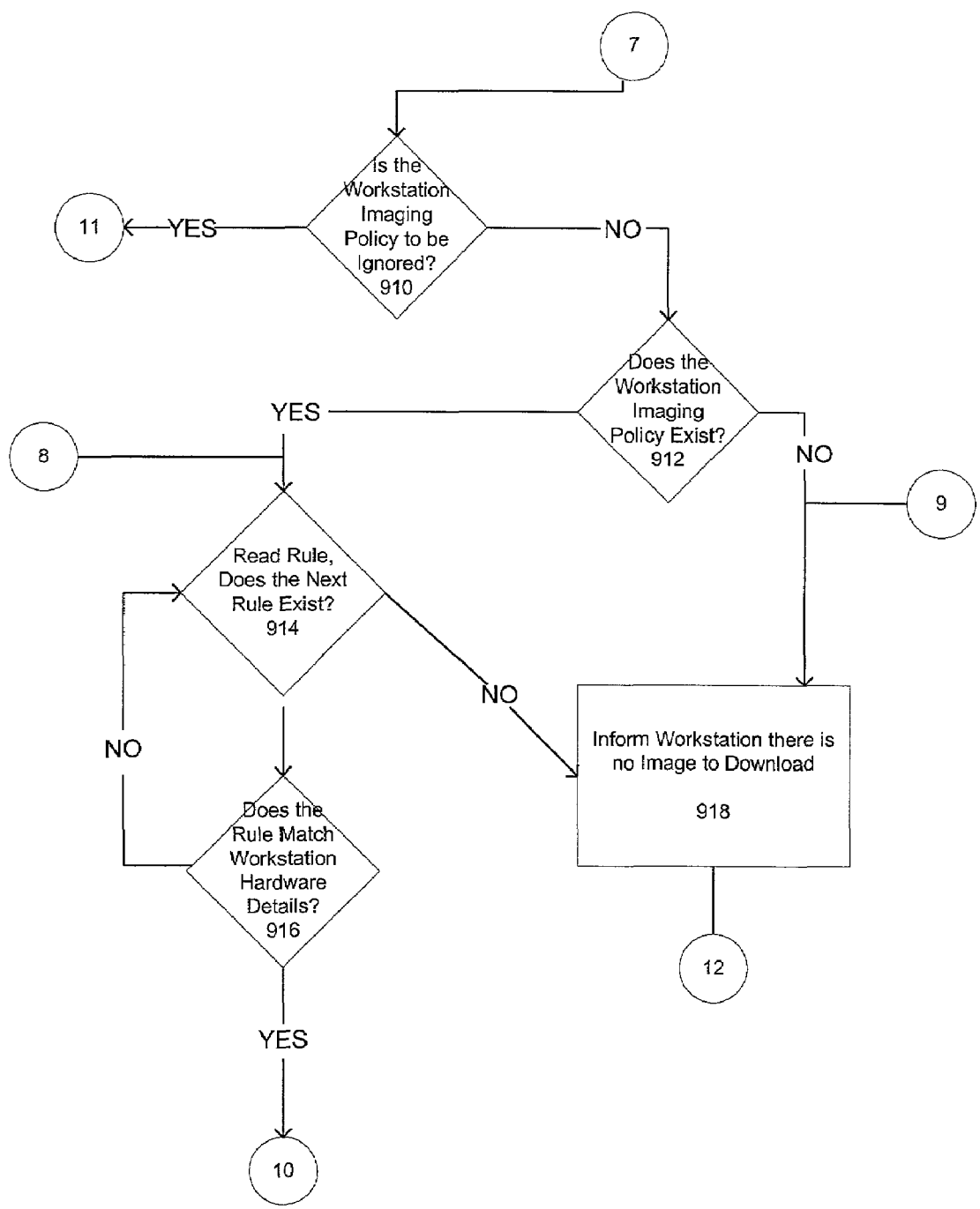

At 910 in FIG. 9, the image server may determine whether the workstation imaging policy is to be ignored. If not, the image server may determine whether the workstation imaging policy exists, at 912. The workstation imaging policy may include various rules and/or criteria that may be applied under certain conditions or circumstances. If a workstation imaging policy does exist, the image server may read or otherwise access a rule and determine whether the next or subsequent rule exists, at 914. If not, the image server may inform the workstation that there is no image to download, at 918. If a next or subsequent rule exists, the image server may determine whether the rule matches workstation hardware (and/or other) details, at 916.

Figure 10:
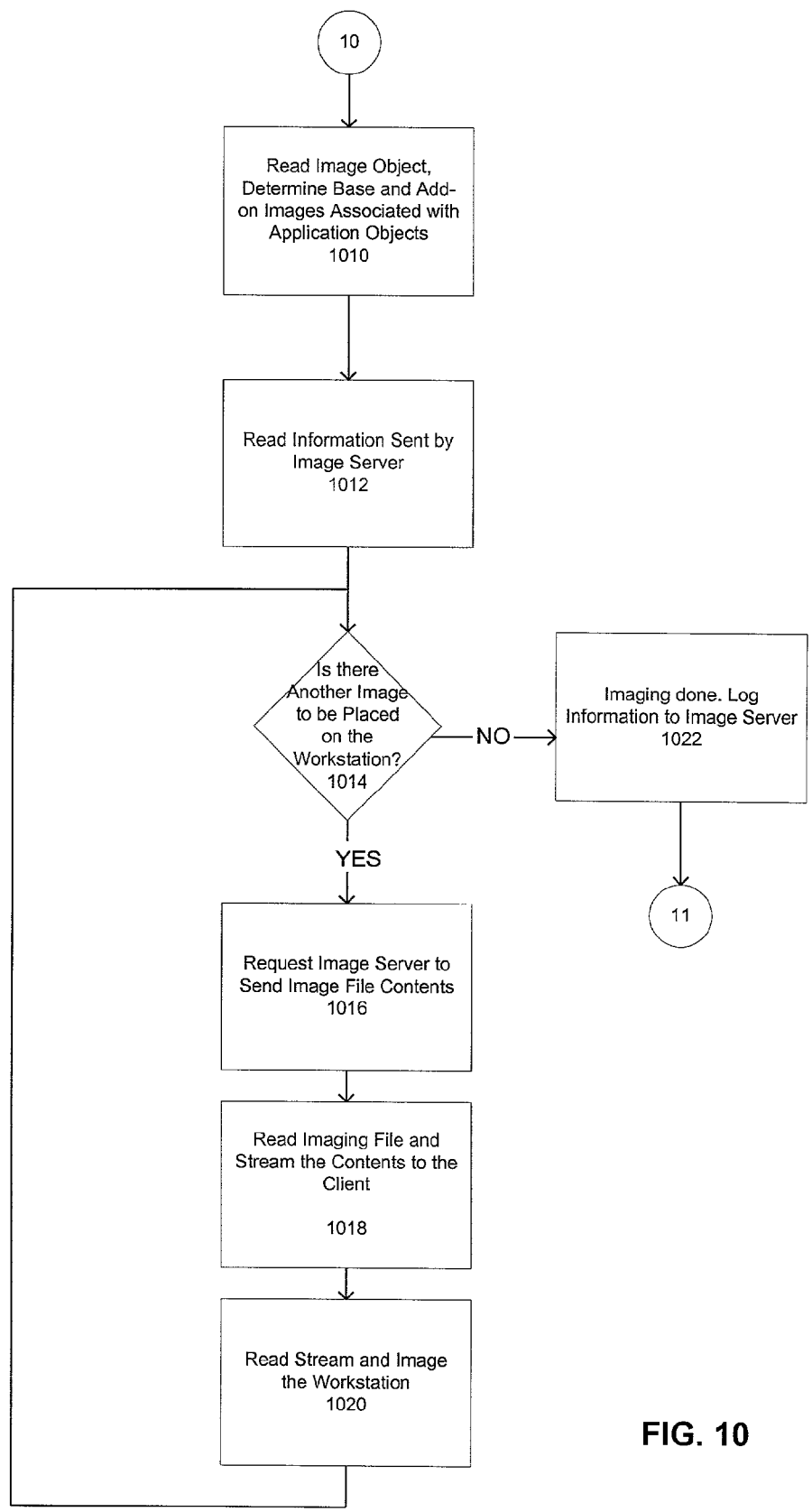

At 1010 in FIG. 10, the image server may read or otherwise access the image object, determine the base and add-on images associated with application objects and send the information to the workstation, device or other destination. At 1012, the imaging client may read information sent by the image server. The imaging client may determine if there is another image to be placed on the workstation, at 1014. If not, the imaging client may determine that imaging is completed and information may be logged to the imaging server, at 1022. If there is another image to be placed on the workstation, the imaging client may request the image server to send the image file contents, at 1016. The image server may then read the imaging file and stream the contents to the client, at 1018. The imaging client may read the stream and image the workstation or device, at 1020. This may include making partitions, if it is the first image in the series. Also included is formatting, if required. Also, files may be placed in the image on the workstation or device, at 1020.

Figure 11:
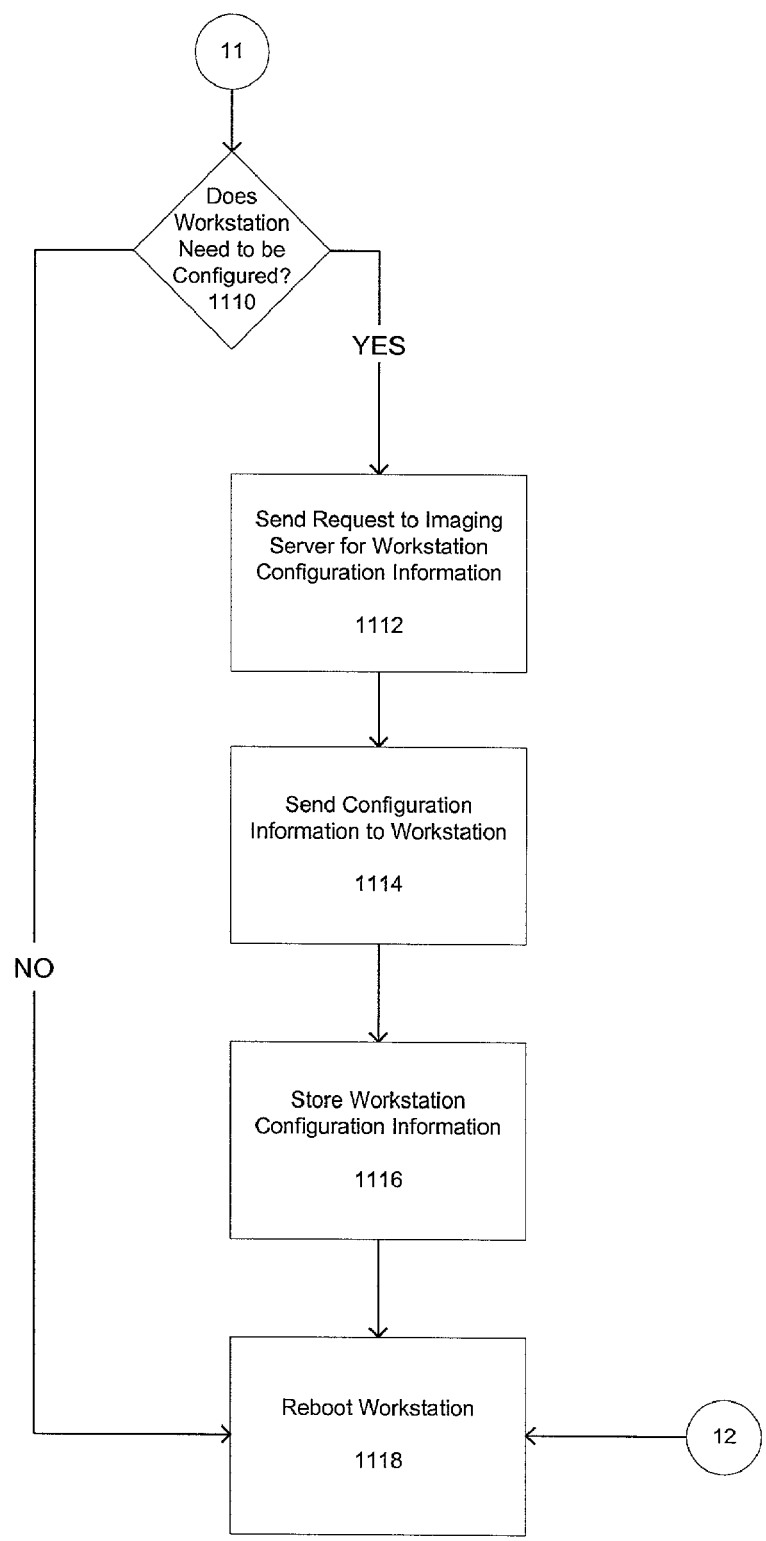

At 1110 in FIG. 11, it may be determine whether the workstation or device may be configured. If so, imaging client may send the request to the image server for workstation configuration (and/or other) information, at 1112. The image server may then send the configuration (and/or other) information to the workstation or device, at 1114. The imaging client may store the workstation configuration (and/or other) information, at 1116. The imaging client may then reboot the workstation at 1118.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A method of placing at least one image on a device and associating one or more additional images to the image based on preselected criteria, the method comprising the steps of:
    obtaining hardware information from the device, wherein the hardware information includes at least one of device type, storage device size, and amount of random access memory;
    applying an imaging server policy, wherein the imaging server policy comprises at least one rule that is applied to the device based on the hardware information;
    identifying, based on the at least one rule, the at least one image that is to be placed on the device;
    placing a representation of the at least one image of the device into a directory;
    associating the one or more additional images to the at least one image;
    creating at least one customized image, wherein the at least one customized image comprises the at least one image of the device and the one or more additional images; and
    placing the at least one customized image on the device.

2. The method of claim 1 further comprising the step of creating a device object to represent the device in the directory.

3. The method of claim 2 wherein at least one policy is associated with the device object.

4. The method of claim 2, wherein the at least one image is associated with the device object.

5. The method of claim 2 further comprising creating an image object and directly associating the image object with the device object, wherein at least one specified image is applied to the device regardless of the at least one rule specified in the imaging server policy.

6. The method of claim 1 further comprising the step of creating at least one object in the directory and associating the at least one image of the device with the at least one object.

7. The method of claim 6, wherein the step of associating the at least one image of the device with at least one object in the directory comprises establishing at least one relationship with at least one policy in the directory.

8. The method of claim 1, further comprising:
    creating a base image of the device;
    associating the at least one image of the device and the one or more additional images to the base image; and
    updating the customized image to comprise the base image of the device, the at least one image of the device, and the one or more additional images.

9. The method of claim 1, wherein the step of customizing the at least one image further comprises defining one or more file sets, wherein the file sets are inserted into a corresponding one of the at least one image.

10. The method of claim 1, further comprising:
    creating one or more application images;
    defining one or more user characteristics;
    associating the one or more application images to the one or more user characteristics; and
    inserting the one or more application images into corresponding ones of the at least one image.

11. The method of claim 1 wherein the device comprises a workstation.

12. The method of claim 1, wherein the hardware information is obtained from the device during a boot process and the customized image is placed on the device during the boot process.

13. A system for placing at least one image on a device and associating one or more additional images to the image based on a preselected criteria, the system comprising:
    hardware information gathering means for obtaining hardware information from the device, wherein the hardware information includes at least one of device type, storage device size, and amount of random access memory;
    storage means for storing an imaging server policy wherein the imaging server policy comprises at least one rule that is applied to the device based on the hardware information;
    creating means for creating, based on the at least one rule, the at least one image to be placed on the device;
    placement means for placing a representation of the at least one image of the device into a directory;
    associating means for associating the one or more additional images to the at least one image;

customization means for creating at least one customized image, wherein the at least one customized image comprises the at least one image of the device and the one or more additional images; and device placement means for placing the at least one customized image on the device.

14. The system of claim 13, further comprising a device object that represents the device in the directory.

15. The system of claim 14 wherein at least one policy is associated with the device object.

16. The system of claim 14 wherein the at least one image is associated with the device object.

17. The system of claim 14 further comprising image object creating means for creating an image object and direct association means for directly associating the image object with the device object, wherein at least one specified image is applied to the device regardless of the at least one rule specified in the image server policy.

18. The system of claim 13 further comprising object creating means for creating at least one object in the directory and association means for associating the at least one image of the device with the at least one object in the directory.

19. The system of claim 18 wherein the association means comprises establishing means for establishing at least one relationship with at least one policy in the directory.

20. The system of claim 13, further comprising:
base image creating means for creating a base image of the device;
base image associating means for associating the at least one image of the device and the one or more additional images to the base image; and
updating means for updating the at least one customized image to comprise the base image of the device, the at least one image of the device, and the one or more additional images.

21. The system of claim 13, wherein the customization means further comprises definition means for defining one or more file sets and wherein the one or more file sets are inserted into a corresponding one of the at least one image.

22. The system of claim 13, further comprising:
application image creating means for creating one or more application images;
user characteristic defining means for defining one or more user characteristics;
user characteristic associating means for associating the one or more application images to the one or more user characteristics; and
inserting means for inserting the one or more application images into corresponding ones of the at least one image.

23. The system of claim 13 wherein the device comprises a workstation.

24. The system of claim 13, wherein the hardware information gathering means obtains the hardware information from the device during a boot process and the device placement means places the customized image on the device during the boot process.

* * * * *